(12) United States Patent
Govyadinov (10) Patent No.: US 11,389,795 B2
(45) Date of Patent: Jul. 19, 2022

(54) BUBBLE VALVE

(71) Applicant: Hewlett-Packard Development Company, L.P., Spring, TX (US)

(72) Inventor: Alexander N. Govyadinov, Corvallis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 284 days.

(21) Appl. No.: 16/477,824

(22) PCT Filed: Feb. 16, 2017

(86) PCT No.: PCT/US2017/018078
§ 371 (c)(1),
(2) Date: Jul. 12, 2019

(87) PCT Pub. No.: WO2018/151726
PCT Pub. Date: Aug. 23, 2018

(65) Prior Publication Data
US 2019/0366340 A1 Dec. 5, 2019

(51) Int. Cl.
*B01L 3/00* (2006.01)
*F16K 99/00* (2006.01)

(52) U.S. Cl.
CPC .... *B01L 3/502738* (2013.01); *F16K 99/0019* (2013.01); *F16K 99/0044* (2013.01); *B01L 2200/143* (2013.01); *B01L 2300/0663* (2013.01); *B01L 2300/1827* (2013.01); *B01L 2400/0442* (2013.01); *B01L 2400/0655* (2013.01); *B01L 2400/0694* (2013.01); *F16K 2099/0084* (2013.01)

(58) Field of Classification Search
CPC .......... B01L 3/00; B01L 3/502738; B01L 2400/0442; B01L 2400/0655; B01L 2400/0694; B81B 7/00; F16K 99/0019; F16K 99/0044; F16K 2099/0084
See application file for complete search history.

(56) References Cited

U.S. PATENT DOCUMENTS 5,479,196 A 12/1995 Inada
6,062,681 A 5/2000 Field et al.
(Continued)

FOREIGN PATENT DOCUMENTS

CN 103706413 4/2014
WO 2012148412 A1 11/2012
WO WO-2016010861 1/2016

OTHER PUBLICATIONS

Oskooei, A. et al., Bubble-gate for In-plane Flow Control in Microfluidic Channels, (Research Paper), 16th International Conference on Miniaturized Systems for Chemistry and Life Sciences, Oct. 28-Nov. 1, 2012, pp. 317-319.
(Continued)

*Primary Examiner* — Brian J. Sines
(74) *Attorney, Agent, or Firm* — Dicke Billig & Czaja PLLC (57) ABSTRACT

A microfluidic device may include a valve located between a liquid source and a liquid receiver. The valve may include a channel connecting the liquid source to the liquid receiver, a heater within the channel, and a pinch point in the channel between the heater and the liquid receiver. The microfluidic device may include a controller to activate the heater so as to form a bubble sized so as to be captured by the pinch point in the channel to occlude the channel.

13 Claims, 9 Drawing Sheets

(56) References Cited

U.S. PATENT DOCUMENTS

| | | | |
|---|---|---|---|
| 6,065,864 | A | 5/2000 | Evans et al. |
| 6,349,740 | B1 | 2/2002 | Cho et al. |
| 2003/0196714 | A1 | 10/2003 | Gilbert et al. |
| 2012/0261013 | A1 | 10/2012 | Gilbert |
| 2013/0206250 | A1 | 8/2013 | Zhang et al. |

OTHER PUBLICATIONS

Van Der Wjngaart, Wouter et al. "A low-temperature thermopneumatic gas bubble valve." In 19th IEEE International Conference on Micro Electro Mechanical Systems, pp. 198-201. IEEE, 2006.

BUBBLE VALVE

BACKGROUND

Microfluidics technology has found many applications in the biomedical field, cell biology, protein identification and other areas. Such microfluidic technology may include microfluidic valves that control the passage of liquid through a conduit. The scale of microfluidics presents many design challenges with respect to such microfluidic valves.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION OF EXAMPLES

Many microfluidic devices utilize valves that are miniaturized versions of macro-fluidic valves. As such, many existing microfluidic valves employ moving parts such as flexible flaps, membranes, and free-flowing solid plugs. Such microfluidic valves are often unreliable and difficult to fabricate.

Disclosed herein are various example microfluidic devices having valves that avoid much of the reliability issues and fabrication complexities found in many existing microfluidic valves. The disclosed microfluidic valves utilize a bubble forming device, such as a heater, and a pinch point in a channel. The valve is closed by creating a bubble with the heater that is retained by the pinch point and that blocks or occludes the channel. The valve is opened by eliminating the bubble. In one example, the bubble is burped through a vent opening. In some implementations, the state of the valve and the state of the bubble are sensed to provide closed-loop feedback control over operation of the bubble forming device.

Disclosed herein is an example microfluidic device that comprises a valve located between a liquid source and a liquid receiver. The valve may include a channel connecting the liquid source to the liquid receiver, a heater within the channel, and a pinch point in the channel between the heater and the liquid receiver. The microfluidic device may include a controller to activate the heater so as to form a bubble sized so as to be captured by the pinch point in the channel to occlude the channel.

Disclosed herein is an example microfluidic device that comprises a liquid source, a liquid receiver and a bubble valve. The bubble valve comprises a channel connecting the liquid source to the liquid receiver, a bubble forming device, a first pinch point in the channel between the bubble forming device and the liquid receiver and a second pinch point in the channel between the bubble forming device and the liquid source. The second pinch point and the first pinch point forming a valve chamber therebetween that is adjacent the bubble forming device. The valve chamber is to contain a bubble formed by the bubble forming device.

Disclosed herein is an example method for operating an example bubble valve. The example method comprises closing the bubble valve by forming a bubble in a channel between a liquid source and a liquid receiver, the bubble being sized to block flow from liquid source to the liquid receiver. The method comprises opening the bubble valve by burping the bubble through a vent opening.

Figure 1:
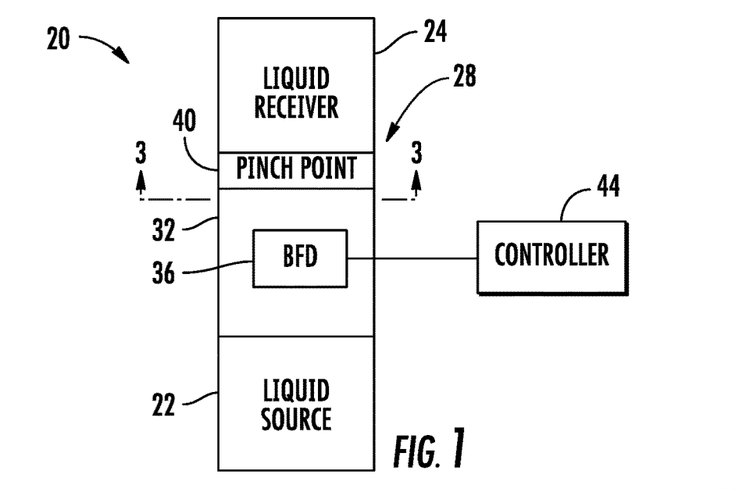
FIG. 1 is a schematic diagram of an example microfluidic device having an example bubble valve.

FIG. 1 is a schematic diagram of an example microfluidic device 20. Microfluidic device 20 includes a valve provided by a bubble forming device, in the form of a heater, that creates a bubble which is captured by a pinch point in a channel so as to block or occlude the channel and close the valve. Elimination of the formed bubble opens the valve. Microfluidic device 20 comprises liquid source 22, liquid receiver 24 and bubble valve 28.

Liquid source 22 comprises a source of liquid to be delivered to liquid receiver 24 upon opening of valve 28. Such a source may be in the form of a flow passage or conduit or may be in the form of a reservoir. Liquid receiver 24 comprises a volume that is to receive liquid that is flowed through valve 28 when valve 28 is in an open state. Liquid receiver 24 may comprise a flow passage or conduit or may be in the form of a reservoir.

Bubble valve 28 comprise a microfluidic valve mechanism that is actuatable between an open state and a closed state. In the open state, valve 28 facilitates the flow of liquid from source 22, through valve 28, to liquid receiver 24. In the closed state, valve 28 slows or completely impedes the flow of liquid from liquid source 22, through valve 28, to liquid receiver 24. Bubble valve 28 comprises channel 32, bubble forming device 36, pinch point 40 and controller 44.

Channel 32 comprise a flow passage interconnecting liquid source 22 to liquid receiver 24. Channel 32 contains pinch point 40 and bubble forming device 36. Although illustrated as having a uniform cross-sectional area or uniform dimensions along its length between source 22 and receiver 24, channel 32 may have a varying cross-sectional shape or bearing dimensions along its length. For example, in some implementations, channel 32 may be parabolic, stepped or tapered along its interior. Channel 32 may be linear, angled or curved. Channel 32 has microfluidic dimensions in that channel 32 is a small size (e.g., of nanometer sized scale, micrometer sized scale, millimeter sized scale, etc.) to facilitate pumping or movement of small volumes of liquid (e.g., picoliter scale, nanoliter scale, microliter scale, milliliter scale, etc.).

Bubble forming device (BFD) 36 comprise a device that controllably generates a bubble within channel 32 on a side of pinch point 40 opposite to liquid receiver 24. In the example illustrated, bubble forming device 36 comprises a heater, wherein the bubble forming device 36 emits heat so as to create or generate a bubble within channel 32 upstream of pinch point 40. In one implementation, bubble forming device 36 comprises a thermal resistor that generates and emits heat in response to an applied electrical current. In one such implementation, the thermal resistor is formed along or within an interior wall of channel 32.

Pinch point 40 comprises a constriction or narrowing in channel 32 between bubble forming device 36 and liquid receiver 24. Pinch point 40 is sized and/or shaped so as to impede passage of a bubble formed by bubble forming device 36 through pinch point 40 to liquid receiver 24. In one implementation, pinch point 40 is shaped so as to seal against the bubble formed by bubble forming device 36 without breaking the formed bubble. In one implementation, pinch point 40 may have a maximum dimension 3 µm to 150 µm. In other implementations, the maximum dimension of pinch point 40 may vary dependent upon fluid surface tension and maximum retention pressures to be obtained. In one implementation, valve 28 is to retain at least 0.01 bar (corresponding to approximately 4 inches of water) pressure so as to not exceed back pressures of many microfluidic architectures.

In one implementation in which microfluidic device 220 controls the flow of water (a surface tension of 72 mN/m) using valve 228, pinch point 40 has a maximum dimension of 150 µm. In another implementation in which microfluidic device 220 controls the flow of blood (a surface tension of 55 mN/m), pinch point 40 may have a maximum dimension of 70 µm. In another implementation in which microfluidic device controls the flow of a Bovine serum albumin (BSA) or Fraction V (a surface tension of 35 mN/M), pinch point 40 may have a maximum dimension of 40 µm. In one implementation in which microfluidic device 220 controls the flow of a water solution saturated with a room temperature and at atmospheric pressure, pinch point 40 has a maximum dimension of 3 to 15 µm, nominally between 8 and 10 µm for water.

Figure 2:
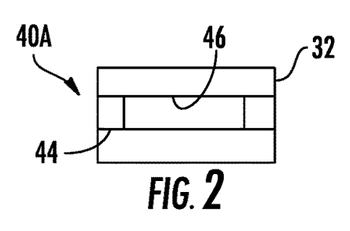
FIG. 2 is a top view of an example pinch point of the bubble valve of FIG. 1.
Figure 3:
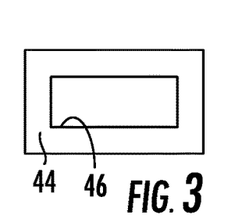
FIG. 3 is a front view of the pinch point of FIG. 2 taken along line 3-3 of FIG. 1.

FIGS. 2-11 illustrate various examples of pinch point 40. FIGS. 2 and 3 illustrate an example pinch point 40A. FIG. 2 is a top view of pinch point 40A while FIG. 3 is a front view of pinch point 40A taken along line 3-3 of FIG. 1. Pinch point 40 comprises a continuous annular structure, ring or wall 44 continuously extending about a central passage 46 through the interior of channel 32.

Figure 4:
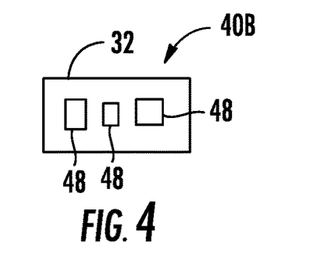
FIG. 4 is a top view of an example pinch point of the bubble valve of FIG. 1.
Figure 5:
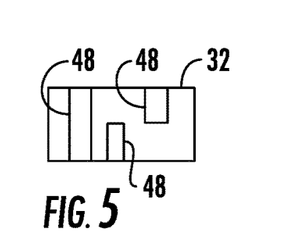
FIG. 5 is a front view of the pinch point of FIG. 4 taken along line 3-3 of FIG. 1.

FIGS. 4 and 5 illustrate another example pinch point 40B. FIG. 4 is a top view of pinch point 40B while FIG. 5 is a front view of pinch point 40B taken along line 3-3 of FIG. 1. As shown by FIGS. 4 and 5, pinch point 40B comprises pillars or posts 48 extending from opposite sides of channel 32. In some implementations, the pillar post may completely extend across channel 32, from one side to the other opposite side.

Figure 6:
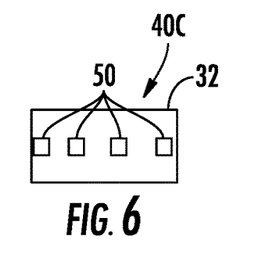
FIG. 6 is a top view of an example pinch point of the bubble valve of FIG. 1.
Figure 7:
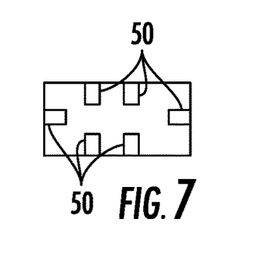
FIG. 7 is a front view of the pinch point of FIG. 6 taken along line 3-3 of FIG. 1.

FIGS. 6 and 7 illustrate another example pinch point 40C. FIG. 6 is a top view of pinch point 40C while FIG. 7 is a front view of pinch point 40C taken along line 3-3 of FIG. 1. As shown by FIGS. 6 and 7, pinch point 40C comprises multiple spaced protuberances 50 extending completely about the interior of channel 32.

Figure 8:
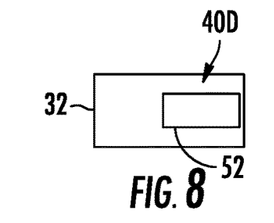
FIG. 8 is a top view of an example pinch point of the bubble valve of FIG. 1.
Figure 9:
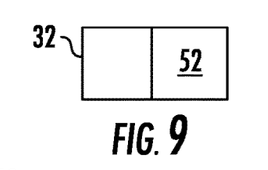
FIG. 9 is a front view of the pinch point of FIG. 7 taken along line 3-3 of FIG. 1.

FIGS. 8 and 9 illustrate another example pinch point 40D. FIG. 8 is a top view of pinch point 40D while FIG. 7 is a front view of pinch point 40D taken along line 3-3 of FIG. 1. As shown by FIGS. 8 and 9, pinch point 40D comprises a protuberance, bulge or wall 52 on one side of channel 32 such that the passage through pinch point 40 is asymmetric with respect to a centerline of channel 32.

Figure 10:
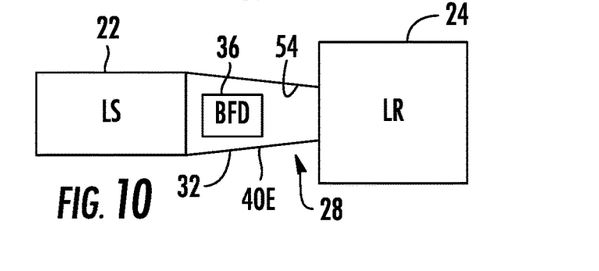
FIG. 10 is a top view of another example microfluidic device having example bubble valve with an example pinch point.

FIG. 10 illustrates another example pinch point 40E. Pinch point 40E comprises a funnel-shaped or tapering passage 54 that narrows as it approaches liquid receiver 24. Pinch point 40E narrow to such an extent that the bubble formed by bubble forming device 36 is captured within the funnel-shaped passage 54, blocking channel 32 and closing the valve 28.

Each of the example pinch points 40A, 40B, 40C and 40D may be utilized as pinch point 40 in FIG. 1. Although each of such example pinch points are illustrated as being provided in an example channel 32 having a rectangular cross sectional shape or interior, in other implementations, such example pinch points 40 may be contained within a channel 32 having an oval cross sectional shape, a circular cross sectional shape or other cross-sectional shapes. In yet other implementations, pinch point 40 may comprise other arrangements that provide a constriction so as to impede the passage of a bubble formed by bubble forming device 36.

Controller 44 comprises actuation logic or electronics that control the actuation of bubble forming device 36. In one implementation, controller 44 may comprise integrated circuitry or an application-specific integrated circuit that carries out such functions. In another implementation, controller 44 may comprise a processing unit that follows instructions stored on a non-transitory computer readable medium. In some implementations, controller 44 may comprise a driver that facilitates the controlled delivery of power to the bubble forming device 36.

Figure 11:
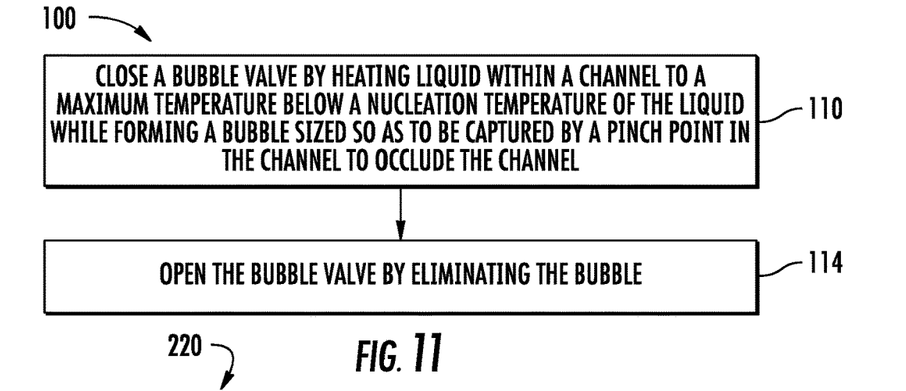
FIG. 11 is a flow diagram of an example method for operating a bubble valve.

In one implementation, controller 44 carries out the example method 100 set forth in FIG. 11. Method 100 facilitates opening and closing of a valve in a microfluidic device. Although method 100 is described as being carried out with microfluidic device 20, it should be appreciated that method 100 may likewise be carried out with any of the other microfluidic devices and bubble valves disclosed hereafter.

As indicated by block 110, controller 44 closes bubble valve 28 by actuating bubble forming device 36, in the form of a heater, to heat liquid within channel 32 to a maximum temperature that is below a nucleation temperature of the liquid. The liquid is heated to a temperature such that the solubility of gas within the liquid drops to a point such that the gas in the liquid, such as air, forms a bubble sized so as to be captured and retained by pinch point 40 in channel 32. The bubble is sized so as to block or occlude channel 32 at pinch point 40. As a result, the flow of liquid through or across pinch point 40 to liquid receiver 24 is stopped or slowed.

As indicated by block 114, controller 44 may open bubble valve 28 by eliminating the bubble that is captured against pinch point 40 and that is blocking the flow of liquid to liquid receiver 24. In one implementation, controller 44 may generate a high pressure burst or pulse of sufficient force, such as through movement of a membrane with a piezo resistive element or through the creation of a second smaller high pressure bubble, so as to expel the bubble through pinch point 40, opening up pinch point 40 for liquid flow and opening bubble valve 28. In another implementation, controller 44 may slow or stop actuation of bubble forming device 36, wherein the formed bubble cools and shrinks so as to pass through pinch point 28 or so as to collapse. In yet another implementation, valve 28 may serve as a pressure relief valve, where in response to pressure of the liquid from liquid source 22 exceeding a predefined pressure threshold, the formed bubble is automatically squeezed through pinch point 40, opening valve 28. As will be described hereafter, in other implementations, the bubble may be eliminated by applying a high pressure burst or pulse so as to expel the bubble through a separate additional opening or vent.

Figures 12, 13:
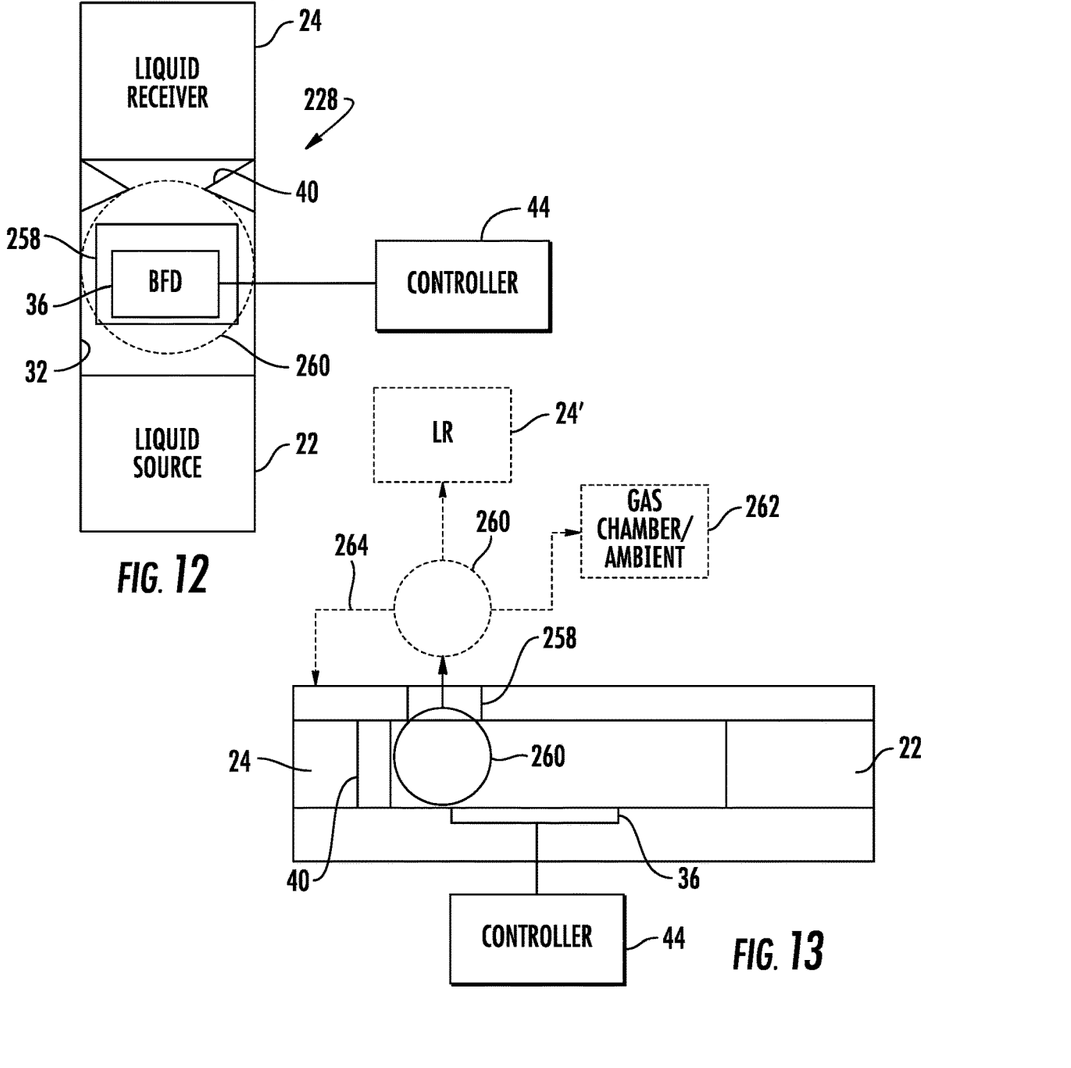
FIG. 12 is a schematic diagram of another example microfluidic device.
FIG. 13 is a sectional view of the microfluidic device of FIG. 12.

FIGS. 12 and 13 are diagrams schematically illustrating another microfluidic device 220. Microfluidic device 220 is similar to microfluidic device 20 except that microfluidic device 220 comprises a bubble valve 228 having a vent opening 258. Those components of microfluidic device 220 which correspond to components of microfluidic device 20 are numbered similarly.

Vent opening 258 comprises an opening and gas flow passage extending from channel 32. Vent opening 258 facilitates the elimination, venting, release or burping of a bubble, such as bubble 260, created by bubble forming device 36, when valve 228 is to be opened. Vent opening 258 facilitates faster opening or valve release. The retention pressure of valve 228, the pressure at which a bubble is squeezed through vent opening 258 may be defined by bore diameter and surface tension of the liquid. In one implementation, the retention pressure is equal to twice the surface tension divided by the radius of the vent opening 258.

Vent opening 258 is sized and/or shaped such that the bubble formed by bubble forming device 36 and blocking pinch point 40, when valve 228 is in a closed state, cannot escape channel 32 through vent opening 258 in the absence of pressures being exerted upon the bubble above a predefined pressure threshold. Although vent opening 258 is illustrated as being rectangular, in other implementations, vent opening 258 may be circular, square, triangular or any other shape.

In one implementation, the predefined pressure threshold is such that bubble 260 cannot pass through or be squeezed through vent opening 258 by the range of pressures of fluid being supplied from liquid source 22. In one implementation, vent opening 258 is sized and/or shaped such that the bubble 260 cannot be squeezed through vent opening 258 in the absence of an applied high pressure burst or high-pressure above the maximum pressure of the fluid being supplied from liquid source 22. In yet another implementation, vent opening 258 may be sized and/or shaped so as to have a predefined pressure threshold that facilitates valve 228 serving as a pressure relief valve, wherein the bubble 260 is expelled through vent opening 258, opening valve 228, automatically in response to the predefined pressure threshold being satisfied.

In one implementation, vent opening 258 is sized and/are located such that liquid within channel 32 is inhibited from flowing through vent opening 258. In one implementation, vent opening 258 is connected to or communicates with a remote gas chamber or ambient air/environment 262 to where the discharged bubble 260 passes. In one implementation, vent opening 258 is formed in a ceiling or sidewall in channel 32 above the level of fluid within channel 32. In another implementation, opening 258 extends along a liquid-gas interface such that a capillary meniscus formed across opening 258 retains liquid within channel 32, inhibiting the flow or escape of liquid through vent opening 258.

In one implementation, vent opening 258 allows liquid flow through vent opening 258 when valve 228 is in an open state. In such an implementation, vent opening 258 may extend into connection with another liquid receiver 24' or may bypass pinch point 40 by extending back to liquid receiver 24 as indicated by arrow 264. In one implementation, vent opening 258 is located and/or sized such that when valve 228 is in a closed state, the bubble 260 also occludes or blocks vent opening 258 (as shown by FIG. 13). The valve 228 is opened by discharging the bubble 260 through vent opening 258, wherein the bubble either passes on to liquid receiver 24 or the other liquid receiver 24', or is broken or dissipated remote from channel 32. In such an implementation, vent opening 258 is sized larger than pinch point 40 so as to have a lower pressure threshold as compared to pinch point 40 such that bubble 260 passes through vent opening 258 rather than across pinch point 40 when valve 228 is opened.

In the example illustrated in FIGS. 12 and 13, bubble forming device 36 comprises a heater, wherein the bubble forming device 36 emits heat so as to create or generate a bubble within channel 32 upstream of pinch point 40. In one implementation, bubble forming device 36 comprises a thermal resistor that generates and emits heat in response to an applied electrical current. In one such implementation, the thermal resistor is formed along an interior wall of channel 32 so as to reduce interference with the flow of fluid through channel 32 when valve 28 is opened.

In implementations where bubble forming device 36 comprises a heater, such as a thermal resistor, controller 44 may open valve 228 by operating in a mode in which the heater is heated to a temperature above the nucleation temperature of the liquid within channel 32. Heating the liquid within channel 32 to a temperature above the nucleation temperature of the liquid vaporizes the adjacent liquid, creating a second high-pressure pulse or bubble sufficient to expel the bubble through vent opening 258. The second bubble may also pass through vent opening 258 or may be smaller than the initial bubble so as to pass through pinch .40. In other implementations, bubble forming device 36 may comprise other devices that form a bubble in channel 32.

Figure 14:
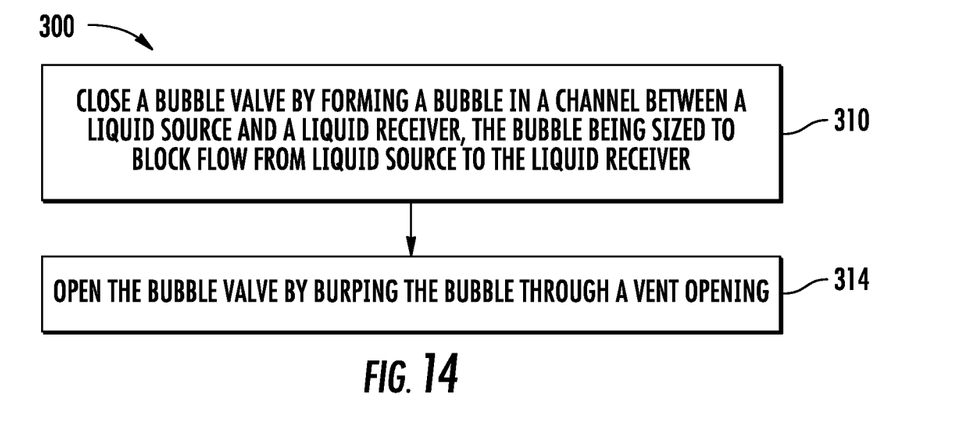
FIG. 14 is a flow diagram of an example method for operating a bubble valve.

FIG. 14 is a flow diagram of an example method 300 for operating a bubble valve, such as bubble valve 228. Method 300 utilizes a vent to assist in opening of the valve. Although method 300 is described in conjunction with microfluidic device 220 and bubble valve 228, method 300 may be utilized with any of the microfluidic devices and bubble valve disclosed hereafter that include a vent or the other similar microfluidic devices and bubble valve that included event.

As indicated by block 310, controller 44 closes valve 228 by forming a bubble 260 in channel 32 between liquid source 22 and the liquid receiver 24. The formed bubble 260 is sized to block flow from liquid source 22 to liquid receiver 24. As shown by FIG. 13, in one implementation, the formed bubble 260 seals against pinch point 40 to inhibit such flow of liquid to liquid receiver 24. In one implementation, bubble 260 additionally blocks vent opening 258. In another implementation, liquid is diverted through vent opening 258 in response to bubble 260 blocking liquid flow across pinch point 40.

In one implementation, controller 44 generates the bubble by heating liquid within channel 32 to a maximum temperature that is below a nucleation temperature of the liquid. The liquid is heated to a temperature such that the solubility of gas within the liquid drops to a point such that the gas in the liquid, such as air, forms a bubble sized so as to be captured and retained by pinch point 40 in channel 32. In another implementation, controller 44 generates a bubble by heating the liquid within channel 32 to a temperature above its nucleation temperature, vaporizing portions of the liquid to create the bubble. In another implementation, controller 44 generates a bubble in other fashions.

As indicated by block 314, controller 44 opens bubble valve 228 by burping the bubble 260 through vent opening 258. In one implementation, controller 44 generates or applies a high-pressure pulse to burp bubble 260 through vent opening 258. For example, in one implementation, controller 44 may create a high-pressure pulse by heating liquid within channel 32 to a temperature above its nucleation temperature so as to create a second bubble of sufficient pressure to expel bubble 260 through vent opening 258, wherein the second created bubble either passes through vent opening 258 as well or is smaller in size so as to be passable through pinch point 40. In another implementation, controller 44 creates a high-pressure pulse by actuating a membrane adjacent to channel 32. For example, in one implementation, controller 44 may actuate a piezo resistive element that moves a membrane to create a pressure pulse sufficient to squeeze bubble 260 through vent opening 258 and thereby open bubble valve 228.

Figure 15:
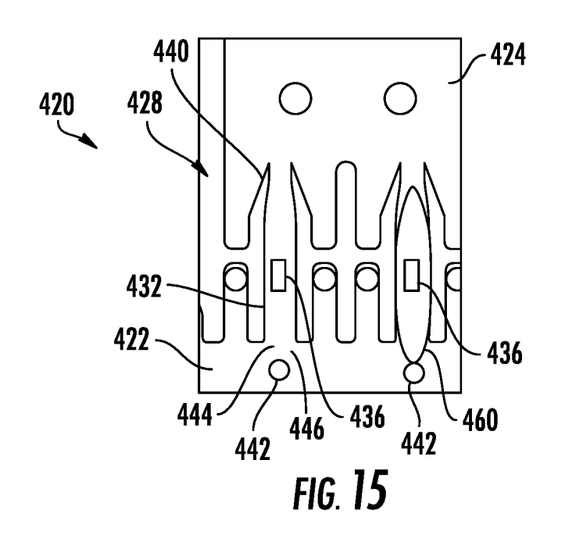
FIG. 15 is a top view of a portion of an example microfluidic device having an example bubble valve.
Figure 16:
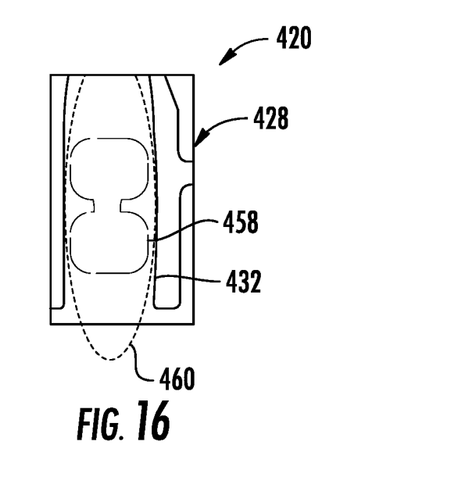
FIG. 16 is a top view of the portion of the microfluidic device of FIG. 15, illustrating an example vent opening of the bubble valve.

FIGS. 15 and 16 illustrate portions of another example microfluidic device 420. Microfluidic device 420 comprises liquid source 422, liquid receiver 424 and bubble valve 428. Liquid source 422 and receiver 424 are similar to liquid source 22 and receiver 24 described above. Bubble valve 428 comprises channel 432, bubble forming device 436, pinch point 440 (each of which is shown in FIG. 15), pinches 444 and 446 formed by pillar 442, and vent opening 458 (shown in FIG. 16).

Channel 432 extend between and connects liquid source 422 and liquid receiver 424. Bubble forming device 436 is similar bubble forming device 36 described above. In one implementation, bubble forming device 436 comprises a heater under the control of controller 44 (described above). In one implementation, the controller 44 actuates bubble forming device 436 to generate the bubble by heating liquid within channel 432 to a maximum temperature that is below a nucleation temperature of the liquid. The liquid is heated to a temperature such that the solubility of gas within the liquid drops to a point such that the gas in the liquid, such as air, forms a bubble size so as to be captured and retained by pinch point 440 in channel 32. In another implementation, controller 44 generates a bubble by heating the liquid within channel 432 to a temperature above its nucleation temperature, vaporizing portions of the liquid to create the bubble. In another implementation, controller 44 generates a bubble in other fashions.

Pinch point 440 comprise a narrowing or constricted portion along channel 432. Pinch point 440 narrows or is constricted to an extent so as to block the passage of a bubble 460 formed by bubble forming device 436. As a result, as shown by FIG. 15, bubble 460 blocks or occludes channel 432, closing valve 428.

As shown by FIG. 16, vent opening 458 comprise an opening along an upper side or surface of channel 432. Vent opening 458 is sized smaller than the size of bubble 460 such that bubble 460 cannot flow or pass through vent opening 458 at a pressure that is less than a predefined or predetermined threshold pressure. In one implementation, the size and shape of the end opening 458 provides a predetermined threshold pressure at a level above the expected maximum pressure of the liquid flowing through or provided by liquid source 422, wherein an additional pressure pulse above the predetermined threshold may be utilized to open valve 428. In another implementation, the size and shape of an opening 458 provides a predetermined threshold pressure at a level such that valve 428 serves as a pressure relief valve, wherein bubble 460 passes through vent passage 458 in response to a predetermined relief pressure threshold.

As further shown by FIG. 16, in the example illustrated, vent opening 458 has a dual-lobed or figure "8" shape. The dual lobed shape inhibits unintended expulsion of bubble 460 through vent opening 458 while allowing bubble 460 to be intentionally expelled when valve 428 is to be opened. In other implementations, vent opening 458 may have other shapes.

Figure 17:
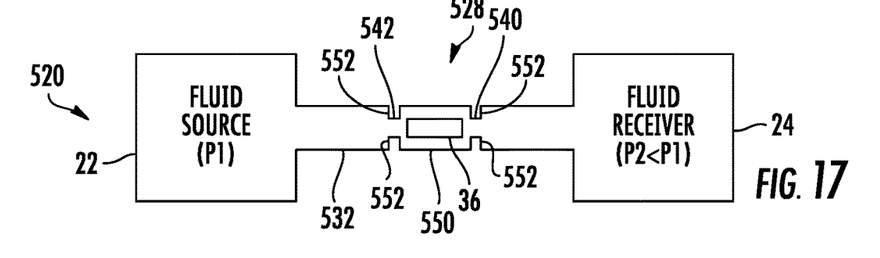
FIG. 17 is a schematic diagram of another example microfluidic device having an example bubble valve in an open state.
Figure 18:
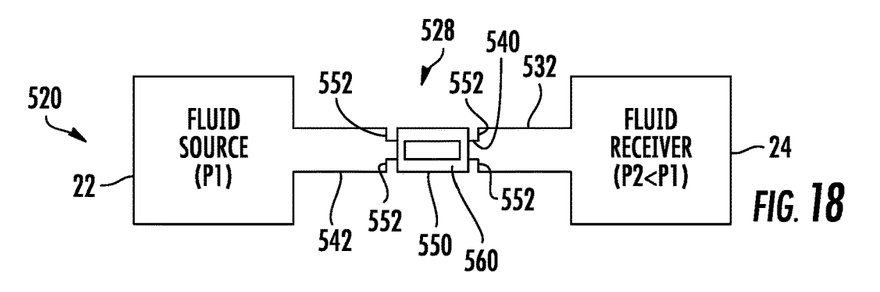
FIG. 18 is a schematic diagram of the example microfluidic device of FIG. 17 with the example bubble valve in a closed state.

FIGS. 17-21 illustrate various other example microfluidic devices. Each of such microfluidic devices comprises controller 44 (shown in FIGS. 1 and 12) that controls each bubble forming device of each of the microfluidic bubble valve of the various example microfluidic devices as described above, such as described respect to methods 100 and 300. FIGS. 17 and 18 are schematic diagrams illustrating another example microfluidic device 520. Microfluidic device 520 comprises liquid or fluid source 22, liquid or fluid receiver 24 and microfluidic bubble valve 528. Source 22 and receiver 24 are similar to source 22 and receiver 24, respectively, described above. Source 22 contains liquid at a first pressure P1 while receiver 24 contains a fluid at a second pressure P2 less than the first pressure P1 such that liquid within source 22 is biased to flow towards receiver 24. FIG. 17 illustrates bubble valve 528 in an open state. FIG. 18 illustrates bubble valve 528 in a closed state.

Bubble valve 528 comprises microfluidic channel 532, bubble forming device 36, pinch points 540, 542 and controller 44 (shown and described above with respect to FIGS. 1 and 12). Microfluidic channel 532 interconnects source 22 and receiver 24. Bubble forming device 36 is described above respect to microfluidic device 220.

Pinch points 540 and 542 comprise narrowing or constricted portions along channel 532. Pinch point 540 is located between fluid source 22 and bubble forming device 36. Pinch point 542 is located between bubble forming device 36 and fluid receiver 24. Pinch points 540 and 542 cooperate to form a valve chamber 550 therebetween. Valve chamber 550 contains bubble forming device 36. In one implementation, the valve chamber 550 formed by pinch points 540, 542 have a size of 10 to 30 µm³, wherein such pinch points have maximum dimensions of 5 to 11 µm. In such implementations, channel 532 may have a size from the pinch points dimension to a macro scale, from 100 µm to 1 mm and above.

In the example illustrated, pinch points 540 and 542 are formed by constricting walls 552 extending from opposite sides of channel 532. In other implementations, each of pinch points 540 and 542 may have any of the shapes described above with respect to pinch point 40, such as those shown in FIGS. 2-6. In some implementations, pinch points 540 542 may be differently sized and/or shaped relative to one another.

As shown by FIG. 18, to actuate valve 528 from the open state shown in FIG. 17 to the closed state shown in FIG. 18, controller 44 generates control signals actuating bubble forming device 36 within chamber 550. In one implementation, the formed bubble 560 refill chamber 550, blocking or reducing liquid flow in either direction across chamber 550. Chamber 550 captures and retains bubble 560. To once again open valve 528, controller 44 eliminates bubble 560. As described above, in one implementation, controller 44 may allow the bubble to cool or collapse. In another implementation, controller 44 may apply a pressure pulse sufficient to squeeze bubble 560 through pinch point 540 towards fluid receiver 24.

Figure 19:
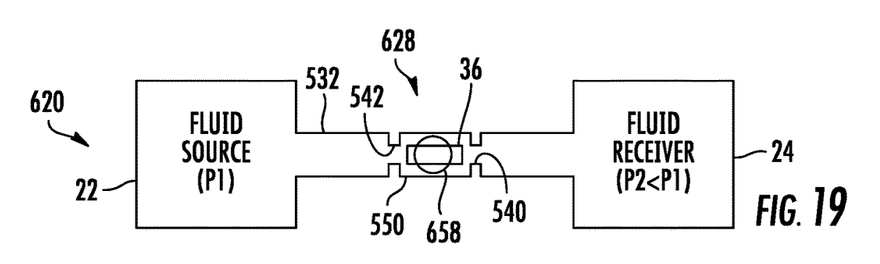
FIG. 19 is a schematic diagram of another example microfluidic device having an example bubble valve.

FIG. 19 is a schematic diagram of another example microfluidic device 620. Microfluidic device 620 is similar to microfluidic device 520 except that microfluidic device 620 comprises a microfluidic bubble valve 628 that additionally comprises vent opening 658. Those remaining components of microfluidic device 620 and bubble valve 628 which correspond to components of microfluidic device 520 and bubble valve 528 are numbered similarly.

Vent opening 658 is similar to vent opening 258 described above. Vent opening 658 is located adjacent or along chamber 550. Vent opening 658 comprises an opening and gas flow passage extending from channel 32. Vent opening 658 facilitates the elimination or discharge of a bubble, such as bubble 560, created by bubble forming device 36 when valve 528 is to be opened. Vent opening 658 is sized and/or shaped such that the bubble formed by bubble forming device 36 and blocking pinch point 540 and pinch point 542, when valve 528 is in a closed state, cannot escape channel 32 through vent opening 658 in the absence of pressures being exerted upon the bubble above a predefined pressure threshold.

In one implementation, the predefined pressure threshold is such that bubble 560 cannot pass through or be squeezed through vent opening 658 by the range of pressures of fluid being supplied from liquid source 22. In one implementation, vent opening 258 is sized and/or shaped such that the bubble 560 cannot be squeezed through vent opening 658 in the absence of an applied high pressure burst or high-pressure above the maximum pressure of the fluid being supplied from liquid source 22. In yet another implementation, vent opening 658 may be sized and/or shaped so as to have a predefined pressure threshold that facilitates valve 528 serving as a pressure relief valve, wherein the bubble 560 is expelled through vent opening 658, opening valve 528, automatically in response to the predefined pressure threshold being satisfied.

In one implementation, vent opening 658 is sized and/are located such that liquid within channel 532 is inhibited from flowing through vent opening 658. In one implementation, vent opening 658 is connected to or communicates with a remote gas chamber or ambient air/environment 262 (illustrated in FIG. 13) to where the discharged bubble 560 passes. In one implementation, vent opening 658 is formed in a ceiling or sidewall in channel 532 above the level of fluid within channel 532. In another implementation, opening 658 extends along a liquid-gas interface such that a capillary meniscus formed across opening 658 retains liquid within channel 532, inhibiting the flow or escape of liquid through vent opening 658.

In one implementation, vent opening 658 allows liquid flow through vent opening 658 when valve 528 is in an open state. In such an implementation, vent opening 658 may extend into connection with another liquid receiver 24' (shown in FIG. 13) or may bypass pinch point 540 by extending back to liquid receiver 24 or may bypass pinch 542 back to fluid receiver 24. In one implementation, vent opening 658 is located and/or sized such that when valve 528 is in a closed state, the bubble 560 also occludes or blocks vent opening 658 (as shown by FIG. 13). The valve 528 is opened by discharging the bubble 560 through vent opening 658, wherein the bubble either passes on to liquid receiver 24 or the other liquid receiver 24', or is broken or dissipated remote from channel 532. In such an implementation, vent opening 658 is sized larger than pinch point 540 so as to have a lower pressure threshold as compared to pinch point 540 such that bubble 560 passes through vent opening 658 rather than across pinch point 540 when valve 528 is opened. In one implementation, vent opening 658 is sized larger than pinch point 542 so as to have a lower pressure threshold as compared to pinch point 542 such that bubble 560 passes through vent opening 658 rather than across pinch point 542 when valve 528 is opened.

Figure 20:
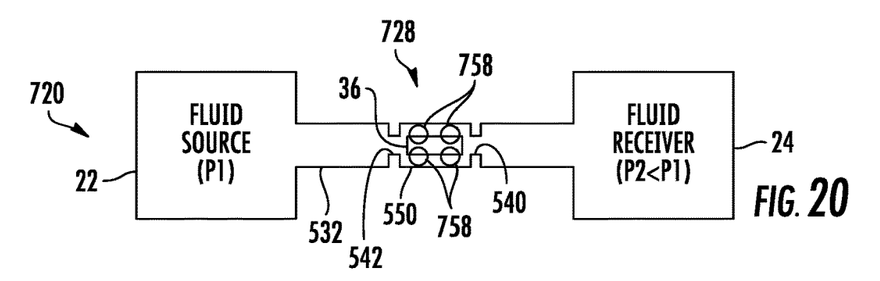
FIG. 20 is a schematic diagram of another example microfluidic device having an example bubble valve.

FIG. 20 is a diagram schematically illustrating another example microfluidic device 720. Microfluidic device 720 is similar microfluidic device 620 described above except that microfluidic device 720 comprises a microfluidic bubble valve 728 that comprises multiple vent openings 758 adjacent or along chamber 550. The multiple vent openings 758 may facilitate smaller sized vent openings 658 through which bubble 560 (shown in FIG. 18) may be expelled or discharge when valve 728 is to be opened. The smaller size vent openings 758 may extend along liquid-air interfaces such that capillary menisci formed across such that openings have higher burst pressures so as to inhibit the flow of liquid within chamber 550 through such that openings 758. In other words, the smaller sized individual vent openings 758 increase the valve release pressure of bubble valve 728, the pressure at which the bubble within the chamber 550 is expelled and valve 728 is opened.

Figure 21:
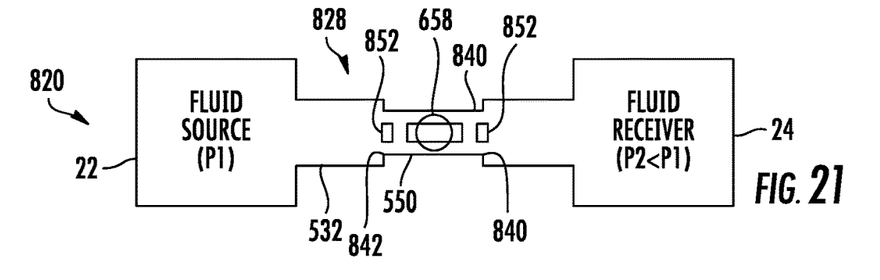
FIG. 21 is a schematic diagram of another example microfluidic device having an example bubble valve.

FIG. 21 is a schematic diagram of another example microfluidic device 820. Microfluidic device 820 is similar to microfluidic device 620 described above except that microfluidic device 720 comprises a microfluidic bubble valve 828 that comprises multiple pinch points 840 and multiple pinch points 842 in lieu of pinch points 540 and 542, respectively. Those remaining components of device 820 and valve 828 which correspond to components of device 620 and valve 628 are numbered similarly.

Pinch points 840, 842 are similar to pinch points 540 and 542 except that pinch points 840 and 842 are formed by columns, pillars or posts 852 projecting into channel 532. The multiple pinch points 840 and the multiple pinch points 842 facilitate a greater flow cross-sectional area to decrease total fluidic resistance of valve 828 while retaining the valve retention pressure due to the small dimensions of the pinch points being maintained. Although pinch points 840, 842 are illustrated as being formed by a single column, pillar or post 852, in other implementations, pinch points 840, 842 may each comprise multiple spaced columns or posts, arranged in a row or staggered across channel 532 so as to form chamber 550. The resulting flow passage around the post 852 of each of pinch points 840, 842 may be sized as described above with respect to pinch points 540 and 542.

Figure 22:
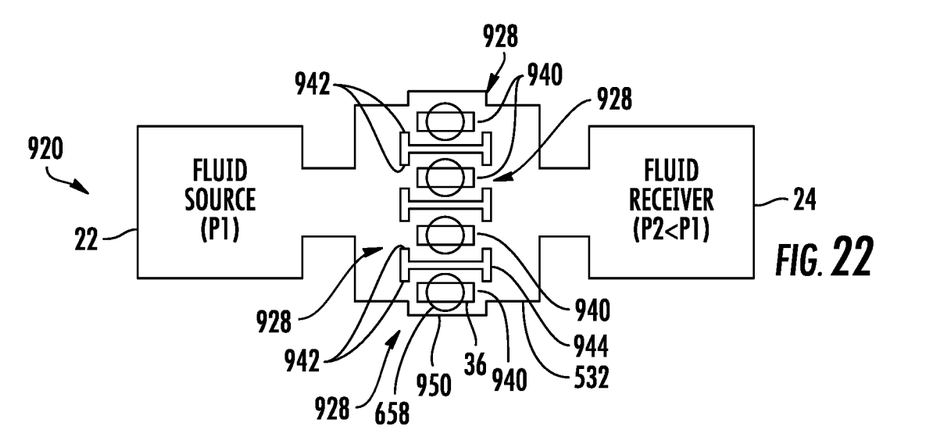
FIG. 22 is a schematic diagram of another example microfluidic device having an example bubble valve.

FIG. 22 is a diagram schematically illustrating another example microfluidic device 920. Microfluidic device 920 is similar to microfluidic device 620 described above except that microfluidic device 920 comprises multiple microfluidic bubble valves 928 in parallel with one another between source 22 and receiver 24. Each of the microfluidic bubble valves 928 comprises a corresponding pinch point 940 and a corresponding pinch point 942 which cooperate with divider walls 944 to form individual and separated valve chambers 950. Each valve chamber 950 is adjacent to an associated bubble forming device 36 and an adjacent vent passage 658 (described above). In some implementations, divider walls 944 may be omitted. In some implementations, pinch points 942 may be omitted.

In one implementation, each of the bubble valves 928 is opened or closed in unison or concurrently with all of the other bubble valves 928. As a result, valves 928 function as a single valve. The smaller size of pinch points 940, 942 may facilitate the use of smaller bubbles 560 (illustrated above) which may be easier to generate or a greater threshold pressure at which such bubbles 560 pass through such pinch points in response to the pressure P1 of the liquid supplied by source 22. As a result, valves 928 may inhibit the flow of liquid at a higher pressure from a fluid source 22.

In one implementation, each of the bubble valves 928 is independently actuatable by controller 44. By selectively opening and closing different numbers of the overall set of different microfluidic valves 928, controller 44 may control the rate at which liquid from fluid source 22 flows to receiver 24. For example, each of such valves 928 may be actuated to a closed state. Alternatively, in the example illustrated, one and up to four of the bubble valves 928 may be opened to control the rate at which liquid flows to receiver 24.

Figure 23:
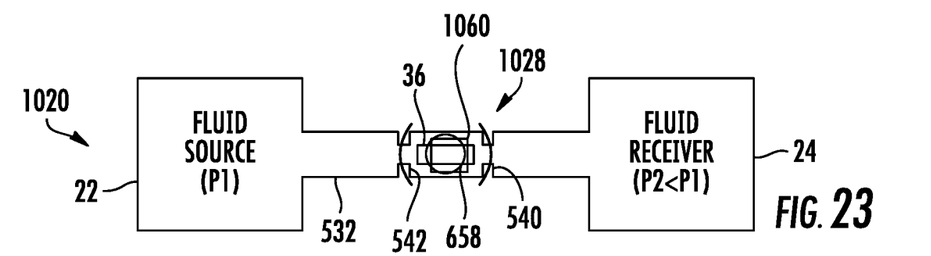
FIG. 23 is a schematic diagram of another example microfluidic device having an example bubble valve.
Figure 24:
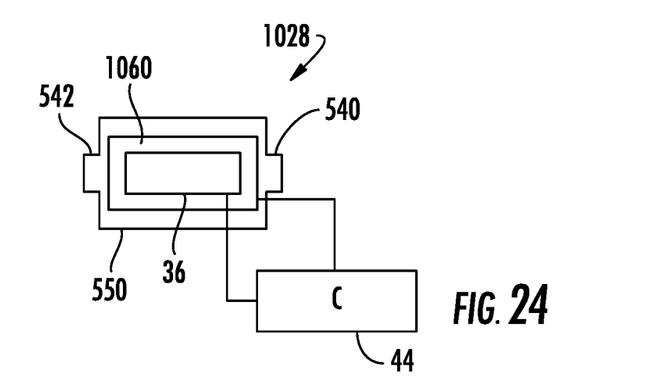
FIG. 24 is an enlarged view of the example bubble valve of the microfluidic device of FIG. 23.

FIGS. 23 and 24 illustrate another example microfluidic device 1020 having bubble valve 1028. Microfluidic device 1020 is similar to microfluidic device 620 except that microfluidic device 1020 provides closed-loop feedback control over bubble forming device 36. Bubble valve 1028 is similar to bubble valve 628 except the bubble valve 1028 additionally comprises sensor 1060. Those remaining components of microfluidic device 1020 which correspond upon the microfluidic device 620 are numbered similarly.

Sensor 1060 outputs signals that are transmitted to controller 44 and from which controller 44 may determine the state of valve 1028 and/or the state of a bubble within chamber 550. Examples of different types of sensors 60 include, but are not limited to, resistive/impedance sensors, flow sensors and optical sensors. In one implementation, sensor 1060 is located within chamber 550 and outputs signals indicating the actual state of a bubble. For example, in one implementation, sensor 1060 may comprise a pair of electrodes that facilitate monitoring of the size of the bubble within chamber 550. In another implementation, sensor 1060 may be located within channel 532 outside of chamber 550, wherein the sensor 1060 outputs signals indicating the flow of liquid through channel 532 which may be dependent upon the state of valve 1028 and the state of the bubble within chamber 550.

Based upon the state of the flow through valve 1028 or the state of the bubble within chamber 550, controller 44 outputs control signals controlling the operation of bubble forming device 36. For example, when closing valve 1028, controller 44 may utilize signals from sensor 1060 to output signals repeatedly actuating bubble forming device 36 to produce a sufficiently sized bubble so as to block pinch point 540. Signals from sensor 1060 may be used by controller 44 when determining how many times to actuate bubble forming device 36 or how or when to adjust the operational parameters of bubble forming device 36.

Controller 44 may further utilize signals from sensor 1060 to output signals actuating bubble forming device 36 so as to maintain a bubble within chamber 550 so as to maintain valve 1028 in a closed state. Controller 44 may further utilize signals from sensor 1060 to output signals adjusting the operation of bubble forming device 36 or cessating the actuation of bubble forming device 36 so as to either collapse the bubble, allow the bubble to dissipate or so as to burp the bubble through vent opening 658 when valve 1028 is to be opened.

Figure 25:
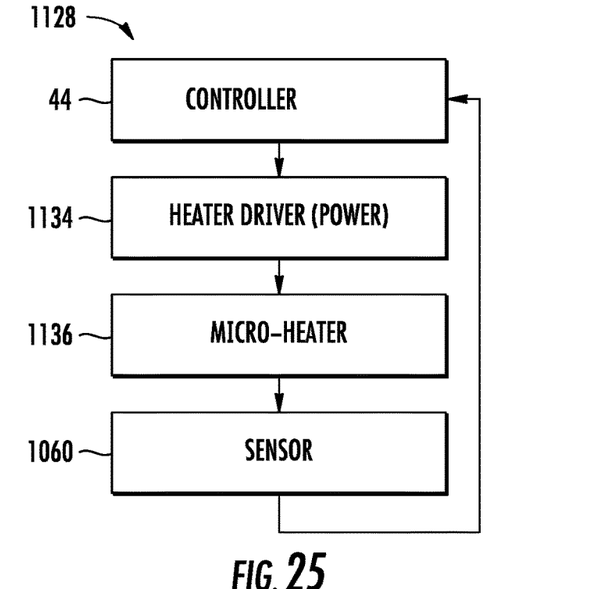
FIG. 25 is a diagram of another example microfluidic device having an example bubble valve.

FIG. 25 is a schematic diagram of another example microfluidic valve 1128. Microfluidic valve 1128 comprises controller 44, heater driver 1134, micro-heater 1136 and sensor 1060. As indicated by the illustrated flow in FIG. 25, depending upon whether valve 1128 is to be in an open state or a closed state, controller 44 outputs control signals to the circuitry of heater driver 1134 so as to control the supply power to a bubble forming device in the form of a micro-heater 1136. In one implementation, micro-heater 1136 comprises a thermal resistor.

Micro-heater 1136 emits heat in response to receiving power from driver 1134. The signals from controller 44 to heater driver 1134, which control micro-heater 1136, control the intensity and/or duration of heat generated a micro-heater 1136. The intensity and/or duration of heat is dependent upon whether a bubble is to be initially created so as to actuate valve 1128 from an open state to a closed state, whether an already formed bubble is to be maintained so as to maintain valve 1128 in a closed state, whether an already formed bubble is to be allowed to cool or collapse to open valve 1128 or whether a second smaller bubble at a high pressure is to be formed to burp the already formed bubble through a vent passage to open valve 1128.

Sensor 1060 senses the state of valve 1128 in response to the heat emitted by heater 1136. Sensor 1060 outputs signals that controller 44 utilizes to determine the state of valve 1128. Based upon the determined state of valve 1128, controller 44 adjust the control signals outputted to driver 1134. As a result, bubble valve 1128 provides closed-loop feedback control over micro-heater 1136 and the state of valve 1128.

In one implementation, micro-heater 1136 may be warmed is a constant current, using pulse width modulation, using proportional integral derivative controller mechanisms or through digital control, wherein frequency in the number of firing pulses of predetermined electric energy are applied. In one implementation, sensor 1060 sends a signal proportional to the air bubble size to controller 44, wherein controller 44 determines whether to continue warming up the micro-heater 1136 are turning it off.

Figure 26:
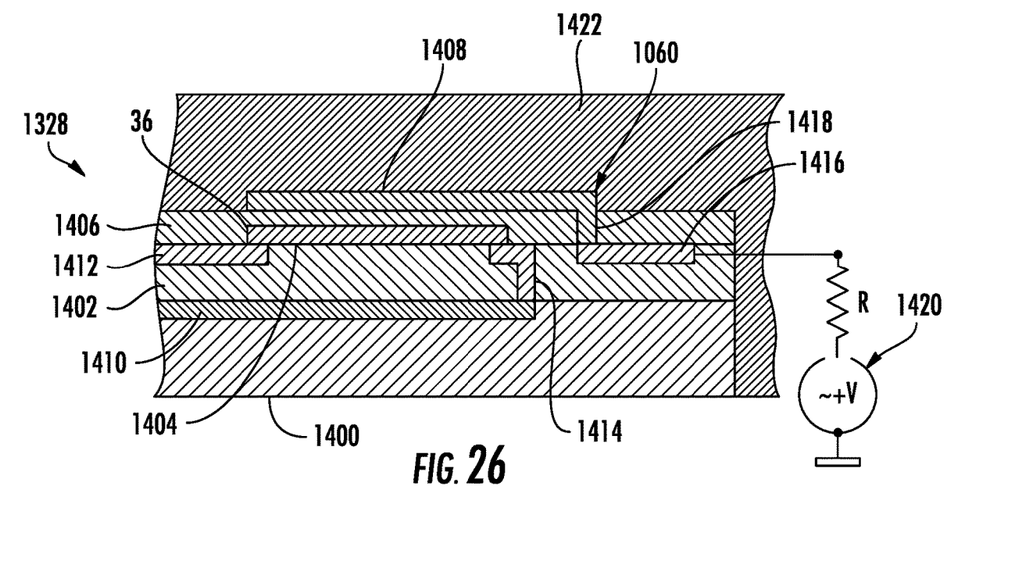
FIG. 26 is a sectional view of a portion of another example microfluidic device having an example bubble valve.

FIG. 26 is a sectional view illustrating portions of a microfluidic bubble valve 1328 that facilitates closed-loop feedback control of the valve in a fashion similar to that described above with respect to valve 1128. Bubble valve 1328 may be employed between a fluid source 22 and a fluid receiver 24 in a channel 532 as described above. Bubble valve 1328 comprises a constriction 40, 540, 840, 940 in channel 532 and against which a formed bubble is retained closable valve 1328. In some implementations, bubble valve 1328 may comprise an additional second constriction 542, 842, 942 in channel 532 so as to form a belt chamber as described above. Bubble valve 1328 utilizes a bubble forming device 36 in the form of a micro-heater and utilizes a sensor 1060 in the form of a single electrode that measures impedance or direct current (DC) resistance to indicate a state of valve 1328.

Bubble valve 1328 comprises substrate 1400, dielectric layer 1402, thermal resistor 1404, dielectric layer 1406 and sensor electrode 1408. Substrate 1400 comprises a base layer of dielectric material. In one implementation, substrate 1400 comprises silicon. In other implementations, substrate 1400 may be formed from a polymer, ceramic, glass or other dielectric material.

Dielectric layer 1402 comprise a layer of dielectric material such as $SiO_2$, $Si_3N_4$, SiOxNy, SiC, $HfO_2$, $Al_2O_3$, diamond like carbon DLC, TiN polyimide, cyclic olefin copolymer and other inorganic dielectrics and high glass transition polymers. Dielectric layer 1402 is supported by substrate 1400 while supporting thermal resistor 1404. Thermal resistor 1404 extends on dielectric layer 1402 and comprises a material that emits heat in response to receiving electrical current. In one implementation, thermal resistor 1404, which serves as a micro-heater, is formed from a material such as WSiNx. In other implementations, thermal resistor 1404 is formed from other materials. Thermal resistor 1404 is part of an electrical circuit which additionally includes electrically conductive traces 1410, 1412 and electrically conductive via 1414. Application of electrical current across thermal resistor 1404 by a heater driver associated with a controller 44 results in the resistor 1404 generating a sufficient amount of heat to form a bubble sized so as to close valve 1328. In some implementations in which valve 1328 additionally comprises a vent opening 658, 758, the controller 44, controlling the application of electric current to resistor 1404, is operable in a second mode. In the second mode, electric current is applied across thermal resistor 1404 so as to generate sufficient amount of heat to form a second smaller bubble of sufficient pressure to expel the valve closing bubble through the vent passage, wherein the second smaller bubble is sufficiently small so as to pass through pinch point of valve 1328, opening valve 1328.

Dielectric layer 1406 comprises a layer of dielectric material, such as $SiO_2$, $Si_3N_4$, SiOxNy, SiC, $HfO_2$, $Al_2O_3$, diamond like carbon DLC, TiN polyimide, cyclic olefin copolymer and other inorganic dielectrics and high glass transition polymers. deposited on and over thermal resistor 1404. Dielectric layer 1406 supports sensor electrode 1408. Sensor electrode 1408 comprises a single electrode that is to measure impedance or DC resistance with reference to the material of the die (silicon) or with reference to the conductive fluid in the fluid supply or slot. In one implementation, sensor electrode 1408 is formed from a material such as tantalum, platinum or gold. In other implementations, sensor electrode 1408 may be formed from other materials. As shown by FIG. 26, sensor electrode 1408 receives charge by electrically conductive trace 1416 and electrically conductive via 1418 which are connected to a voltage source 1420. In the example illustrated, sensor electrode 1408 is in direct contact with the liquid 1422 flowing across bubble forming device 36 and sensor 1060.

Figure 27:
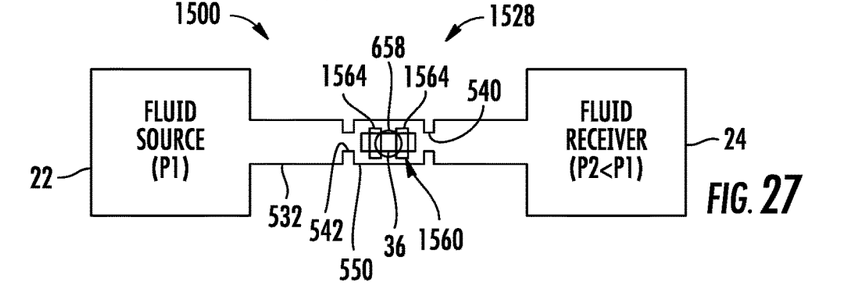
FIG. 27 is a schematic diagram of another example microfluidic device having an example bubble valve.

FIG. 27 is a diagram schematically illustrating another example microfluidic device 1520. Microfluidic device 1520 is similar to microfluidic device 1020 except that microfluidic device 1520 comprises a bubble valve 1528 that comprises sensor 1560 in lieu of sensor 1060. Those remaining components of microfluidic device 1520 and bubble valve 1528 which correspond to components of microfluidic valve 1020 and bubble valve 1028 are numbered similarly.

Sensor 1560 outputs signals that are transmitted to controller 44 and from which controller 44 may determine the state of valve 1528 and the state of a bubble within chamber 550. Sensor 1560 is located within chamber 550 and outputs signals indicating the actual state of a bubble. In the example illustrated, sensor 1560 comprises a pair of electrodes 1564 and monitor the current, resistance or impedance between the two electrodes. Such signals are used by controller 44 to control the operation of bubble forming device 36. For example, in implementations where both foreign device 36 comprises a micro-heater, controller 44 may utilize signals from sensor 1560 to control bubble forming device 36 in a fashion similar to that described above with respect to FIG. 25.

Figure 28:
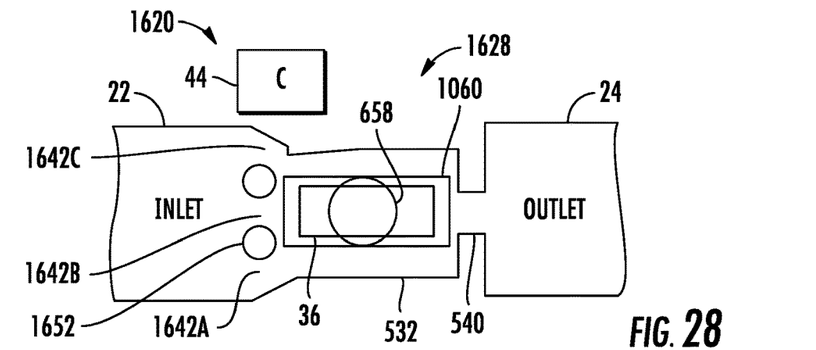
FIG. 28 is a schematic diagram of another example microfluidic device having an example bubble valve.

FIGS. 28-34 illustrate various other example microfluidic devices having a bubble valve. FIG. 28 is a diagram schematically illustrating an example microfluidic device 1620 having multiple pinch points in parallel. Microfluidic device 1620 comprises liquid source or inlet 22, liquid outlet or receiver 24, and bubble valve 1628. Bubble valve 1628 comprises channel 532, bubble forming device 36, vent opening 658, sensor 1060 each of which is described above. Bubble valve 1628 further comprises pinch points 540 and pinch points 1642A, 1642B and 1642C (collectively referred to as pinch points 1642). Pinch point 1642 are provided by a pair of columns, posts or pillars 1652 located between valve chamber 532 and liquid source 22.

Figure 29:
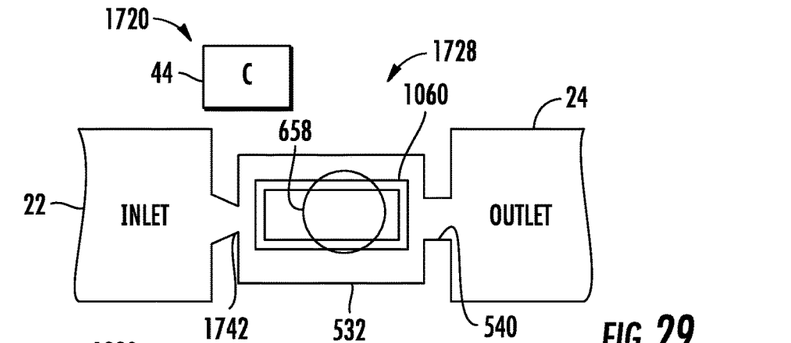
FIG. 29 is a schematic diagram of another example microfluidic device having an example bubble valve.

FIG. 29 is a diagram schematically illustrating an example microfluidic device 1720 having a pinch point in the form of a nozzle. Microfluidic device 1720 comprises liquid source or inlet 22, liquid outlet or receiver 24, and bubble valve 1728. Bubble valve 1728 comprises channel 532, bubble forming device 36, vent opening 658, sensor 1060 each of which is described above. Bubble valve 1728 further comprises pinch points 540 and pinch point 1742. Pinch point 1742 is in the form of a nozzle or diffuser that supplies liquid to chamber 532.

Figure 30:
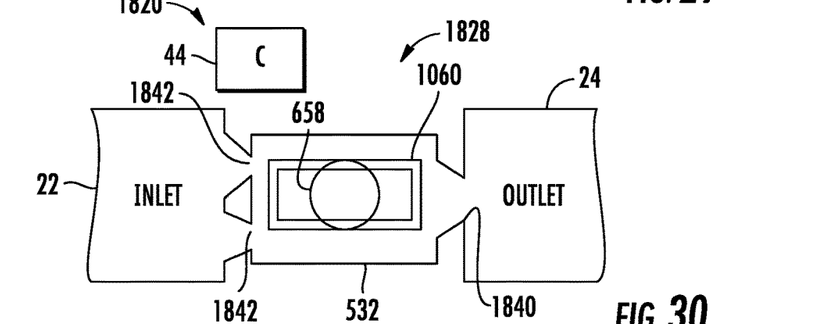
FIG. 30 is a schematic diagram of another example microfluidic device having an example bubble valve.

FIG. 30 is a diagram schematically illustrating an example microfluidic device 1820 having multiple pinch points in the form of nozzles. Microfluidic device 1820 comprises liquid source or inlet 22, liquid outlet or receiver 24, and bubble valve 1828. Bubble valve 1828 comprises channel 532, bubble forming device 36, vent opening 658, sensor 1060 each of which is described above. Bubble valve 1828 further comprises pinch points 1840 and pinch points 1842. Each of pinch points 1814 1842 are in the form of diffusers or nozzles. Pinch point 1840 narrows towards receiver 24 while pinch points 1842 are in parallel and narrow towards valve chamber 532.

Figure 31:
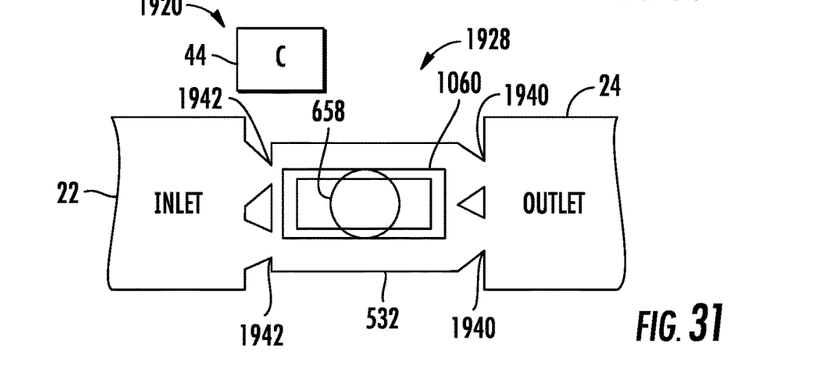
FIG. 31 is a schematic diagram of another example microfluidic device having an example bubble.

FIG. 31 is a diagram schematically illustrating an example microfluidic device 1820. Microfluidic device 1920 is similar to microfluidic device 1820 except that microfluidic device 1920 has a microfluidic valve 1928 which comprises a pair pinch points 1940 in the form of diffusers or nozzles that are parallel to one another and that are between valve chamber 532 and liquid receiver 24.

Figures 32, 33, 34, 35:
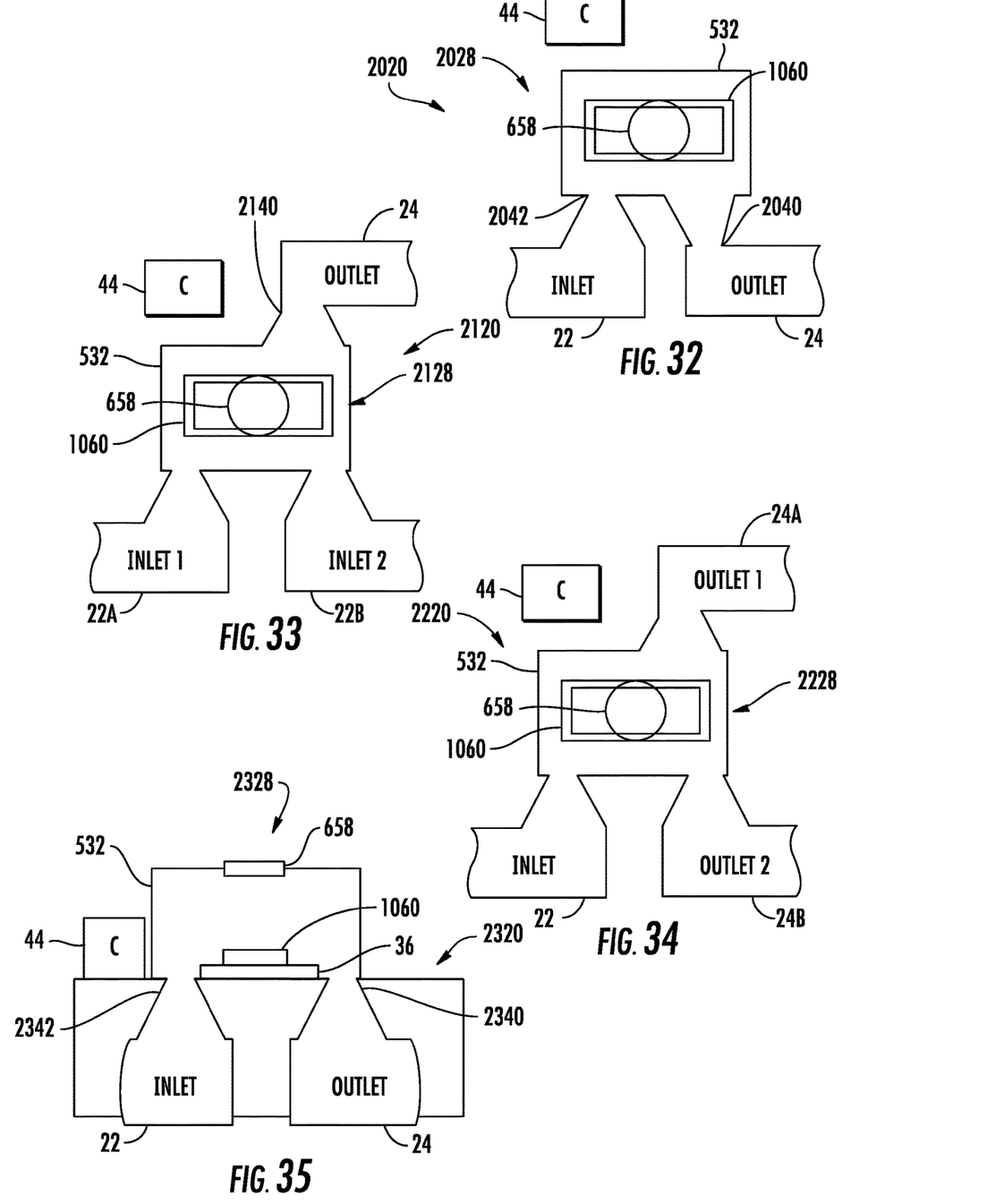
FIG. 32 is a schematic diagram of another example microfluidic device having an example bubble valve.
FIG. 33 is a schematic diagram of another example microfluidic device having an example bubble valve.
FIG. 34 is a schematic diagram of another example microfluidic device having an example bubble valve.
FIG. 35 is a schematic diagram of another example microfluidic device having an example bubble valve.

FIG. 32 is a diagram schematically illustrating an example microfluidic device 2020 having pinch points both on one side of a valve chamber. Microfluidic device 2020 comprises liquid source or inlet 22, liquid outlet or receiver 24, and bubble valve 2028. Bubble valve 1828 comprises channel 532, bubble forming device 36, vent opening 658, sensor 1060 each of which is described above. Bubble valve 2028 further comprises pinch points 2040 and 2042. Each of pinch points 2040, 2042 are in the form of diffusers or nozzles. Pinch point 2040 narrows towards receiver 24 while pinch points 2042 narrows towards valve chamber 532.

FIG. 33 is a diagram schematically illustrating an example microfluidic device 2120 having two separate liquid sources 22A, 22B (collectively referred to as sources 22) which supply liquid to valve chamber 532. In addition to sources 22, microfluidic device 2120 comprises liquid source or inlet 22, liquid outlet or receiver 24, and bubble valve 2128. Bubble valve 2128 comprises channel 532, bubble forming device 36, vent opening 658, sensor 1060 each of which is described above. Bubble valve 2128 further comprises pinch point 2140 and pinch points 2042. Each of pinch points 2040, 2042 are in the form of diffusers or nozzles. Pinch point 2040 narrows towards receiver 24 while pinch points 2042 extend from their respective liquid sources 22 while narrowing towards valve chamber 532.

FIG. 34 is a diagram schematically illustrating an example microfluidic device 2220 having two separate liquid receivers 24A and 24B (collectively referred to as receivers 24) which receive liquid from valve chamber 532. In addition to receivers 24, microfluidic device 2220 comprises liquid source or inlet 22, liquid outlet or receiver 24, and bubble valve 2128. Bubble valve 2228 comprises channel 532, bubble forming device 36, vent opening 658, sensor 1060 each of which is described above. Bubble valve 2228 further comprises pinch points 2240 and pinch point 2242. Each of pinch points 2240, 2042 are in the form of diffusers or nozzles. Pinch points 2240 extend to their respective liquid receivers 24 and narrow towards receivers 24 while pinch point 2242 narrows towards valve chamber 532.

FIG. 35 is a diagram schematically illustrating an example microfluidic device 2320 extending in three dimensions, wherein source 22 and receiver 24 extend in a first plane while valve chamber 532 extends in a second different plane. In addition to receivers 24, microfluidic device 2220 comprises liquid source or inlet 22, liquid outlet or receiver 24, and bubble valve 2128. Bubble valve 2228 comprises channel 532, bubble forming device 36, vent opening 658, sensor 1060 each of which is described above. Bubble valve 2328 further comprises pinch point 2340 and pinch point 2342. Each of pinch points 2340, 2342 are in the form of diffusers or nozzles. Pinch points 2340 narrows towards receiver 24 while pinch point 2242 narrows towards valve chamber 532.

Figure 36:
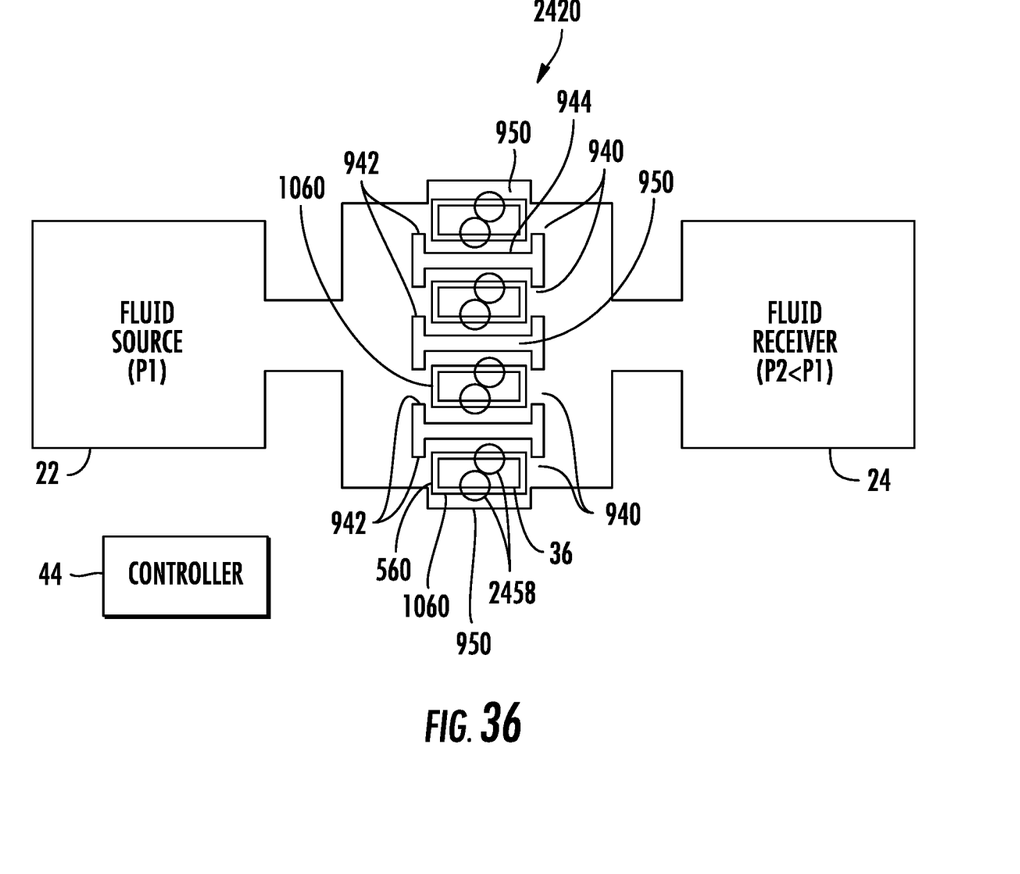
FIG. 36 is a schematic diagram of another example microfluidic device having an example bubble valve.

FIG. 36 is a diagram of another example microfluidic device 2420. Microfluidic device 2420 is similar to microfluidic device 920 described above except that each of microfluidic valves 9208 arranged in parallel within channel 532 comprises multiple vent openings 2458 and additionally comprises sensor 560 (described above). Vent openings 2458 are similar to vent openings 758 described above. Vent openings 2458 extend adjacent or along their respective chambers 950. The multiple vent openings 2458 may facilitate smaller size vent openings 2458 through which bubble 560 (shown in FIG. 18) may be expelled or discharge when valve 2428 is to be opened. The smaller size vent openings 2458 may extend along liquid-air interfaces such that capillary menisci formed across such that openings have higher burst pressures so as to inhibit the flow of liquid within the respective chamber 550 through such that openings 2458.

As described above, sensors 560 provide closed-loop feedback to controller 44 for the operation of each of the individual bubble forming devices 36 of the different bubble valves 2428. In one implementation, each of the bubble valves 2428 is opened or closed in unison or concurrently with all of the other bubble valves 2428. As a result, valves 2420 function as a single valve. The smaller size of pinch points 940, 942 may facilitate the use of smaller bubbles 560 (illustrated above) which may be easier to generate or a greater threshold pressure at which such bubbles 560 pass through such pinch points in response to the pressure P1 of the liquid supplied by source 22. As a result, valves 2428 may inhibit the flow of liquid at a higher pressure from a fluid source 22.

In one implementation, each of the bubble valves 2428 is independently actuatable by controller 44. By selectively opening and closing different numbers of the overall set of different microfluidic valves 2428, controller 44 may control the rate at which liquid from fluid source 22 flows to receiver 24. For example, each of such valves 2428 may be actuated to a closed state. Alternatively, in the example illustrated, one and up to four of the bubble valves 2428 may be opened to control the rate at which liquid flows to receiver 24.

Although the present disclosure has been described with reference to example implementations, workers skilled in the art will recognize that changes may be made in form and detail without departing from the spirit and scope of the claimed subject matter. For example, although different example implementations may have been described as including one or more features providing one or more benefits, it is contemplated that the described features may be interchanged with one another or alternatively be combined with one another in the described example implementations or in other alternative implementations. Because the technology of the present disclosure is relatively complex, not all changes in the technology are foreseeable. The present disclosure described with reference to the example implementations and set forth in the following claims is manifestly intended to be as broad as possible. For example, unless specifically otherwise noted, the claims reciting a single particular element also encompass a plurality of such particular elements. The terms "first", "second", "third" and so on in the claims merely distinguish different elements and, unless otherwise stated, are not to be specifically associated with a particular order or particular numbering of elements in the disclosure.

What is claimed is:
1. A microfluidic device comprising:
a liquid source;
a liquid receiver; and a bubble valve between the liquid source and liquid receiver, the bubble valve comprising:
  a channel connecting the liquid source to the liquid receiver;
  a heater within the channel;
  a first pinch point in the channel between the heater and the liquid receiver;
  a second pinch point in the channel between the heater and the liquid source, wherein the heater is disposed within the channel between the first pinch point and the second pinch point; and
  a controller to activate the heater so as to heat liquid within the channel to a maximum temperature below a nucleation temperature of the liquid while forming a bubble sized so as to be captured by and between the first pinch point and the second pinch point in the channel to occlude the channel.

2. The microfluidic device of claim 1, wherein the bubble valve further comprises a vent opening between the first pinch point and the liquid source, and the controller is to actuate the vent opening from a closed state to an open state to eliminate the bubble captured by and between the first pinch point and the second pinch point.

3. The microfluidic device of claim 2, wherein the bubble valve further comprises a second vent opening between the first pinch point and the liquid source.

4. The microfluidic device of claim 1, wherein the first pinch point and the second pinch point form a valve chamber therebetween that contains the bubble formed by the heater, with the heater being disposed between the first pinch point and the second pinch point within the channel.

5. The microfluidic device of claim 1, further comprises a second bubble valve in parallel with the bubble valve, the second bubble valve comprising:
  a second heater within the channel; and
  a third pinch point in the channel between the second heater and the liquid receiver.

6. The microfluidic device of claim 1, wherein the bubble valve further comprises a sensor disposed within the channel proximate to the first pinch point to sense bubble formation and to transmit signals to the controller indicative of a size of the bubble, the controller to activate the heater based upon the signals transmitted from the sensor.

7. The microfluidic device of claim 1, wherein the second pinch point is in parallel with the first pinch point, and the first pinch point and the second pinch point each include a constriction or narrowing in the channel.

8. The device of claim 1, the second pinch point and the first pinch point form a valve chamber therebetween that includes the heater, the valve chamber to contain the bubble formed by the heater.

9. The device of claim 1, wherein the liquid source contains the liquid at a first pressure and the liquid receiver contains the liquid at a second pressure that is less than the first pressure such that liquid within liquid source is biased to flow towards liquid receiver.

10. The device of claim 1, wherein the controller is to eliminate the bubble that is captured between the first pinch point and the second pinch point and to allow liquid flow to the liquid receiver by performing at least one of:
  actuate a piezo resistive element disposed within the channel proximate to the first pinch point and the second pinch point, wherein in response to the actuation, the piezo resistive element is to move a membrane to form a second bubble of a sufficient pressure to squeeze the bubble through the first pinch point towards the liquid receiver;
  stop or reduce the actuation of the heater to shrink the bubble such that the bubble is to pass through the first pinch point towards the liquid receiver or to collapse; and
  further actuate the heater to a second temperature to generate a second bubble of a sufficient pressure to squeeze the bubble through the first pinch point towards liquid receiver.

11. The device of claim 2, wherein the controller is to create a pressure pulse sufficient to squeeze the bubble through the valve opening and eliminate the bubble by performing at least one of:
  further actuate the heater to a second temperature that is above the nucleation temperature to generate a second bubble to squeeze the bubble through the vent opening;
  actuate a piezo resistive element disposed within the channel proximate to the first pinch point and the second pinch point, wherein in response to the actuation, the piezo resistive element is to move a membrane to create the pressure pulse; and
  stop or reduce the actuation of the heater to shrink the bubble.

12. The device of claim 1, wherein:
  the heater comprises a thermal resistor formed along or within an interior wall of the channel; and
  the first pinch point and the second pinch point are formed by constricting walls extending from opposite sides of channel.

13. The device of claim 6, wherein the controller is to use the signals from the sensor to perform at least one of:
  monitor the bubble size;
  determine a number of times to actuate the heater to form the bubble; and
  determine to adjust the operational parameters of the heater to maintain the bubble between the first pinch point and the second pinch point.

* * * * *